(12) United States Patent
Velednitsky

(10) Patent No.: US 12,154,046 B1
(45) Date of Patent: Nov. 26, 2024

(54) GROUP DECOMPOSITION FOR SHIFT SCHEDULING

(71) Applicant: Amazon Technologies, Inc., Seattle, WA (US)

(72) Inventor: Mark Lipa Velednitsky, Bothell, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 56 days.

(21) Appl. No.: 17/709,196

(22) Filed: Mar. 30, 2022

Related U.S. Application Data

(60) Provisional application No. 63/321,619, filed on Mar. 18, 2022.

(51) Int. Cl.
*G06Q 10/0631* (2023.01)

(52) U.S. Cl.
CPC .............................. *G06Q 10/06311* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | |
|---|---|---|---|
| 5,111,391 A | 5/1992 | Fields et al. | |
| 5,289,368 A * | 2/1994 | Jordan | G06Q 10/06315 379/112.01 |
| 5,911,134 A * | 6/1999 | Castonguay | G06Q 10/06 379/112.09 |
| 6,044,355 A * | 3/2000 | Crockett | H04M 3/5233 705/7.14 |
| 6,144,971 A * | 11/2000 | Sunderman | G07C 1/10 715/205 |
| 7,003,475 B1 * | 2/2006 | Friedland | G06Q 10/0639 705/7.38 |
| 7,672,746 B1 | 3/2010 | Hamilton et al. | |
| 7,725,339 B1 * | 5/2010 | Aykin | G06Q 10/10 705/7.14 |
| 7,860,737 B2 * | 12/2010 | Jordan | G06Q 10/06312 705/7.22 |
| 8,463,638 B2 | 6/2013 | Hamilton et al. | |

(Continued)

OTHER PUBLICATIONS https://www.merriam-webster.com/dictionary/amortize (Year: 2023).*

(Continued)

*Primary Examiner* — Alan S Miller
(74) *Attorney, Agent, or Firm* — Davis Wright Tremaine LLP

(57) ABSTRACT

Systems and methods are described for generating a schedule for resources, such as agents for a contact center service, and mores specifically for decomposing the scheduling problem into groups. In some aspects, a request to generate a schedule spanning a first time period for agents may be received by a scheduling service. Agents having at least one same shift characteristic may be grouped into a scheduling group such that the agents in a given scheduling group are interchangeable. Portions of the workload may be assigned to the different scheduling groups. A set of empty shifts may be produced for each of the scheduling groups to process the corresponding portion of the workload. Shift activities may be assigned to the set of empty shifts for each scheduling group to generate unrostered shifts, the unrostered shifts making up the schedule.

20 Claims, 10 Drawing Sheets

(56) References Cited

U.S. PATENT DOCUMENTS

| | | | |
|---|---|---|---|
| 8,577,706 B1* | 11/2013 | Aykin | G06Q 10/06311 705/7.14 |
| 8,612,272 B1* | 12/2013 | Aykin | G06Q 10/0631 705/7.22 |
| 8,874,456 B2 | 10/2014 | Lakritz et al. | |
| 9,426,291 B1 | 8/2016 | Ouimette et al. | |
| 9,787,840 B1 | 10/2017 | Neuer, III et al. | |
| 10,037,511 B2* | 7/2018 | Braham | G06Q 10/0631 |
| 10,115,065 B1 | 10/2018 | Fama et al. | |
| 10,762,455 B1* | 9/2020 | Sager | G06Q 10/067 |
| 10,819,827 B1* | 10/2020 | Aykin | G06Q 10/06311 |
| 10,970,682 B1* | 4/2021 | Aykin | G06N 5/02 |
| 11,610,670 B1 | 3/2023 | Chen et al. | |
| 11,948,106 B1 | 4/2024 | Yang | |
| 2001/0037229 A1 | 11/2001 | Jacobs et al. | |
| 2001/0047288 A1 | 11/2001 | Jacobs et al. | |
| 2002/0143599 A1* | 10/2002 | Nourbakhsh | G06Q 10/06375 705/321 |
| 2002/0167903 A1 | 11/2002 | Nakano et al. | |
| 2003/0163360 A1* | 8/2003 | Galvin | G06Q 10/06 379/265.03 |
| 2004/0039628 A1 | 2/2004 | Thompson et al. | |
| 2004/0078257 A1 | 4/2004 | Schweitzer et al. | |
| 2004/0193472 A1 | 9/2004 | Ramakrishnan et al. | |
| 2004/0268349 A1 | 12/2004 | Ramakrishnan et al. | |
| 2005/0137925 A1 | 6/2005 | Lakritz et al. | |
| 2008/0004936 A1* | 1/2008 | Fama | G06Q 10/06 705/7.41 |
| 2008/0300955 A1 | 12/2008 | Hamilton et al. | |
| 2009/0021775 A1* | 1/2009 | Rai | G06F 3/1214 358/1.15 |
| 2009/0094087 A1 | 4/2009 | Chung et al. | |
| 2010/0114645 A1 | 5/2010 | Hamilton et al. | |
| 2010/0138379 A1 | 6/2010 | Mott et al. | |
| 2011/0150208 A1* | 6/2011 | Stearns | H04M 3/5158 379/266.07 |
| 2012/0131591 A1* | 5/2012 | Moorthi | G06F 9/5061 718/104 |
| 2013/0090968 A1 | 4/2013 | Borza | |
| 2015/0142488 A1 | 5/2015 | Grace et al. | |
| 2015/0339620 A1 | 11/2015 | Esposito et al. | |
| 2017/0004420 A1 | 1/2017 | Thompson | |
| 2017/0109834 A1 | 4/2017 | Shaaban et al. | |
| 2018/0136976 A1* | 5/2018 | Ammari | G06F 9/505 |
| 2019/0130329 A1 | 5/2019 | Fama et al. | |
| 2020/0344353 A1* | 10/2020 | Lahav | G06Q 10/06 |
| 2020/0380451 A1 | 12/2020 | Izadi | |
| 2020/0394596 A1 | 12/2020 | Sager et al. | |
| 2022/0027837 A1* | 1/2022 | D'Attilio | H04M 3/5175 |
| 2022/0083951 A1 | 3/2022 | Brager et al. | |
| 2023/0162843 A1 | 5/2023 | Martin et al. | |
| 2023/0178228 A1 | 6/2023 | Chen et al. | |
| 2023/0222410 A1* | 7/2023 | Sun | G06Q 10/063116 705/7.16 |

OTHER PUBLICATIONS https://dictionary.cambridge.org/us/dictionary/english/amortize (Year: 2023).*

Agnetis, et al. "Multiagent scheduling." Berlin Heidelberg: Springer Berlin Heidelberg, 2014, 281 pages.

Avramidis, et al. "Optimizing daily agent scheduling in a multiskill call center." European Journal of Operational Research, 2010, 26 pages.

Gans, et al. "Parametric forecasting and stochastic programming models for call-center workforce scheduling." Manufacturing & Service Operations Management, 2015, 44 pages.

Lau, et al. "Agent-based modeling of supply chains for distributed scheduling." IEEE Transactions on Systems, Man, and Cybernetics—Part A: Systems and Humans 36.5, 2006, 15 pages.

USPTO Non-Final Office Action dated Jan. 25, 2024, U.S. Appl. No. 17/709,203, 25 pages.

Elahipanah, "Task Scheduling and Activity Assignment to Work Shifts with Schedule Flexibility and Employee Preference Satisfaction," Phd. Dissertation Ecole Polytechnique de Montreal, 143 pages.

* cited by examiner

GROUP DECOMPOSITION FOR SHIFT SCHEDULING

CROSS-REFERENCE TO RELATED APPLICATIONS

This application claims the benefit of U.S. Provisional Patent Application No. 63/321,619, filed Mar. 18, 2022, the disclosure of which is incorporated herein by reference in its entirety.

BACKGROUND

In many optimization problems, there are multiple goals and objectives, and the problem is typically solved for one goal at a time, improving the solution by considering each objective in turn. This is called goal programming. For personnel scheduling, such as scheduling agents who work in various services, for example in contact centers, or resource scheduling, such as various component or units of computing resources, it is common to break the problem down into generating unrostered shifts. Unrostered shift are defined by start times, end times, and breaks, and then rostering the shifts by assigning resources and/or agents to those shifts. When generating unrostered shifts, the objective is to match the supply pattern to the demand pattern as tightly as possible. When generating rostered shifts, the objective is to honor resource or agent preferences as much as possible. As the number of resources or agents increases, it can become more and more challenging to generate schedules, especially ones that have a number of constraints, in a short or reasonable amount of time. These constraints may include maximum or minimum numbers of hours that an agent can work in a day, week, month, etc., such as dictated by local laws, and/or may include organization imposed constraints, and even agent preferences. These problems are compounded when the constraints apply over longer periods of time within the schedule, thus making it computationally inefficient to break the problem into smaller sub problems.

BRIEF DESCRIPTION OF THE DRAWINGS

Various techniques will be described with reference to the drawings, in which.

DETAILED DESCRIPTION

Figure 1:
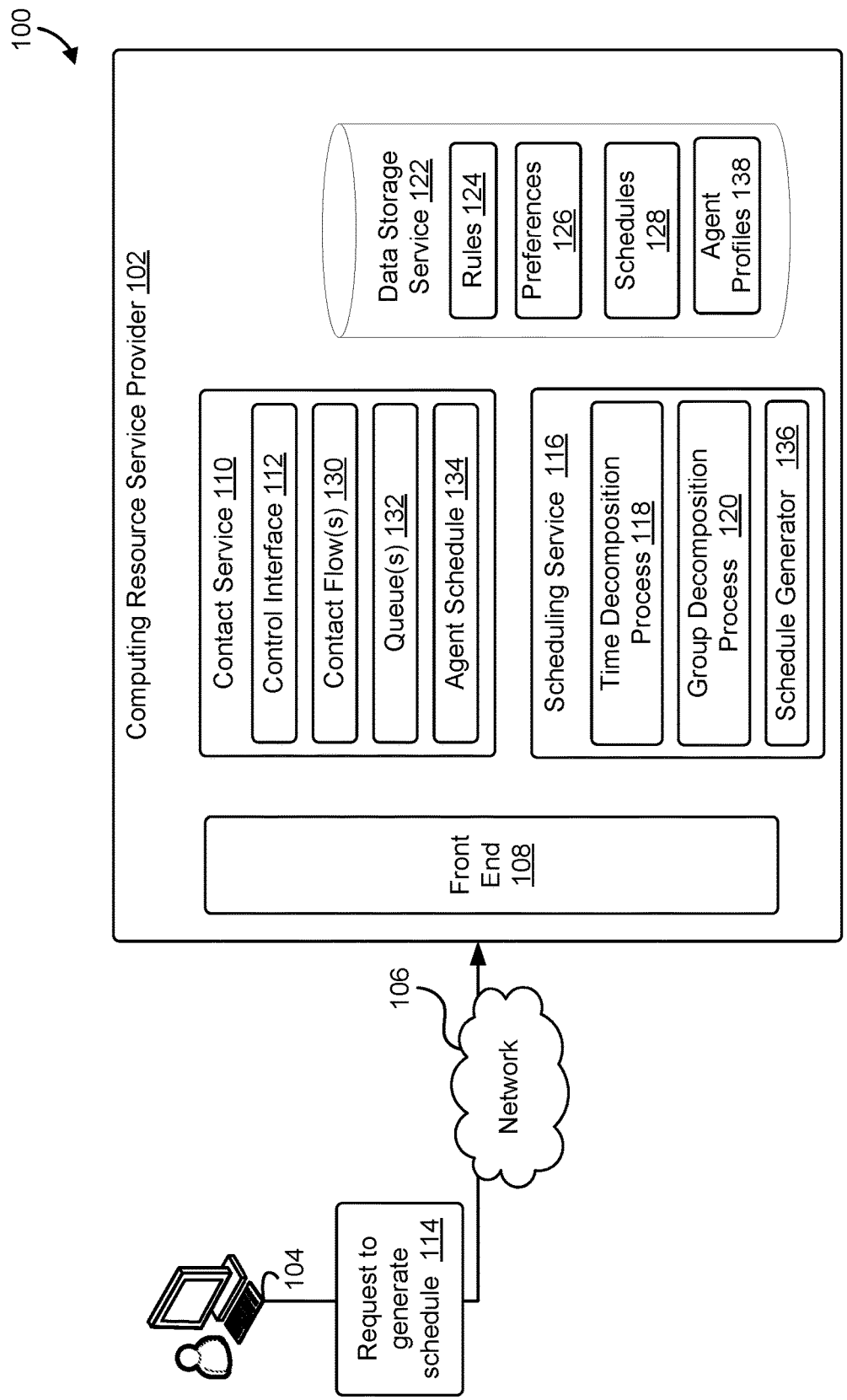
FIG. 1 illustrates an example environment in which the described techniques can be practiced, according to at least one embodiment.

Systems and methods are described herein for generating shifts and assigning resources to those shifts to generate schedules for resources, such as human or computing resources. More specifically, the described techniques decompose a scheduling problem into sub-problems that can be solved in parallel to decrease schedule generation times. In some examples, the described techniques may be applied to human agent scheduling, such as in scenarios where a large number of agents need to be scheduled for particular tasks over a period of time. One specific example use case for these techniques include contact center agents scheduling. In other examples, the described techniques may be applied to scheduling various computing resources, such as processing power, memory usage, virtual machines, containers, and the like. In one aspect, a scheduling problem may be decomposed into stages solved sequentially, where the first stage allocates the overall headcount or minimum resource requirement to groups. A second stage populates shifts with activities (e.g., productive and non-productive), and the third stage rosters agents or resources into the schedule. The first stage, including pre-processing or pre-grouping operations, may be added to current 2 stage processes, to separate a large complex scheduling problem into smaller sub-problems. This first stage includes breaking the total workload, e.g., a contact volume to respond to, into different scheduling groups prior to generated the unrostered shifts. The shifts may be grouped based on common characteristics, such that shifts which are grouped together may generally be viewed as interchangeable (similar tasks or type, similar start and end times, etc.) In these examples, a minimum headcount or resource constraint may be imposed on the schedule, such that shifts are assigned such that this minimum is satisfied during the course of the time window for which the schedule covers.

In some cases, during this first agent or resource group assignment stage, various activities or tasks (e.g., generally broken into productive and non-productive activities) that an agent or resource will perform may be approximated or amortized over the length of the shift. In this way, a minimum resource or headcount requirement may be satisfied when assigning shifts to different groups without an overly precise or time-consuming determination of activity placement in each shift. Once the shifts are broken into group, the shifts may be assigned activities in greater detail, and assigned agents or resources to those shifts to create rostered shifts, in such a way that the headcount minimum is met and any other constraints (e.g., on agent work hours) may be satisfied. The rostered shifts in each scheduling group may then be combined to form a rostered schedule. In some cases, at this stage, individual shift placement and/or workload assignments may be modified to comply with various constraints or rules that may be imposed on the schedule.

In another aspect, a scheduling problem may be broken or decomposed into time windows, such as based on resource usage and/or resource demand patterns. In the contact center example, this may include selecting a time window that conforms to contact volume patterns and/or agent scheduling patterns. In one specific example, the time window may be selected to a be a calendar week, or multiple thereof. Once the schedule is broken into multiple time windows, scheduling different shifts and assigning resources or agents to those shifts may be performed concurrently or in parallel. For each time window, shifts may be assigned at different times to comply with any constraints placed on the schedule, such as a minimum headcount or resource requirement for a given point in the scheduled time period. For any shift that extends past the time window, the time period outside of the time window may be reassigned to another time during that time window, such as at the beginning of the time window. Particularly for shift scheduling where repetition in scheduling individual resources or agents is desirable (e.g., so contact center agents can have consistent work hours), approximating or distorting shift times for purposes of scheduling may prove particularly beneficial. In this way, shift times can be approximated and the number of complicating constants, e.g., constraints that span multiple time windows, can be reduced, thus reducing complexity in generating large schedules and reducing the time it takes to generate these schedules, without loss of significant accuracy. In some cases, when contact volume patterns change significantly over multiple time periods, the start time of the time windows may be adjusted to correspond to a lull in contact volume. In this way, any inaccuracy in the time approximation of shifts within a given time window may be minimized to impact process the contact volume or workload to a lesser extent.

In some aspects, the described decomposition by group techniques and the decomposition by time window techniques may be combined to provide for further advantages in reducing schedule generation time and enhancing the ability to scale to large scheduling problems and tasks.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) a reduction in time in generating schedules for resources; (2) more efficient utilization of computing resources to generate resource schedules; and (3) other advantages as will be made apparent in the rest of this disclosure.

FIG. 1 illustrates an example environment 100 in which a scheduling service 116 and a contact service 110 may be provided by a computing resource service provider 102. The scheduling service 116 may interact with various other computer-implemented services, such as one or more of a front end 108, a contact service 110, and/or a data storage service 122 to generate one or more schedules, as will be described in greater detail below. Various client computing devices 104 may interact with the computing resource service provider 102 through one or more networks 106 to access this functionality.

Client 104 may refer to a client computer system or computing device connected to a server (e.g., computing resource service provider) over a network 106. In some cases, client 104 refers to a user or operator of a client computer system and may be an employee of an organization that utilizes a computing resource service provider 102 to interact with various forms of data, such as through one or more of a scheduling service 116, front end 108, contact service 110, and/or data storage service 122. In some cases, computing device 104 may be associated with the computing resource service provider 102, such as may be provided by or through a contact service or other computerized service 110. In these cases, the computing device 104 may be operated by a human operator or user, such as may be referred to generally as an agent. In other aspects, the agent may be fully automated, including textual and audio communications (e.g., a bot). In some cases, the agent 104 may access various services and data provided by the computing resource service provider 102 to facilitate resolving issues with external customers (not illustrated) of the contact service 110. For example, an agent 104 may communicate with a customer through the contact service 110 and may access a control interface 112 of the contact service 110 to obtain information to help a customer resolve one or more issues with an underlying application or service, such as other $3^{rd}$ party system or application, including various customer relationship management (CRM) systems. In some cases, agent 104 may send a request 114 to the computing resource service provider 102 to generate or modify an agent or resource schedule, as will be described in greater detail below.

In some cases, the front end 108 may receive the request 114 and direct it to the appropriate service. The front end 108 may be a system including a set of web servers (e.g., a single web server or a set of web servers which may be managed by a load balancer) provided by the computing resource service provider 102. Web servers of the front end 108 may be configured to receive various requests and data and to process them according to one or more policies associated with the service. In some examples, client 104 uses client software that is configured to establish a client-server relationship with a service of a computing resource service provider 102. A client 104 may connect to a service via front end 108, which receives requests from clients and routes them to backend services. Front end 108 may interface with one or more of a scheduling service 116, a contact service 110, and/or a data storage service 122, and/or other services offered by a computing resource service provider 102 to its customers. In at least one embodiment, client 104 interacts with a GUI to interact with various data provided by or through the computing resource service provider 102, and client-side software translates the GUI setup to a web service API request which is transmitted from the client computer system 104 to front end 108 via a network 106. In an embodiment, the network 106 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 106 is enabled by wired and/or wireless connections and combinations thereof. In some cases, a network may include or refer specifically to a telephone network such as a public switched telephone network or plain old telephone service (POTS).

The computing resource service provider 102 may provide various services such as data processing, data storage, software applications, security, encryption, and/or other such services. A computing resource service provider 102 described herein may be implemented using techniques described below in reference to FIG. 10. The computing resource service provider 102 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 102 may provide data storage through a data storage service 122 to store and manage large volumes of data, including text, image, and other data. The data storage service 122 may store various data, such as may be organized into various accounts or profiles. In some aspects, the data storage service 122 may store various data used and/or modified by the contact service 110 and/or scheduling service 116 to generate and/or modify schedules, such as various rules 124, preferences 126, and/or schedules themselves 128. In some cases, rules 124 may be obtained from various sources, and may include data structures that capture local rules, laws, ordinances, etc., relating to minimum and maximum hours a human or agent can work in a given time period, such as a day, a work week, etc., time off or break frequency and duration, and so on. Preferences 126 may include times or other attributes of a work schedule that particular agents desire to work, time off, etc. Rules 124 and preferences 126 may be the basis for various constraints utilized by the scheduling service 1156 to generate schedules. The data storage service may also store schedules themselves, such as may be accessed by the contact service 110 to implement the schedules 128. In other cases, the contact service 110 may store local copies of various agent schedules 134, for ease of access and other advantages. In some aspects, the data storage service 122 may additionally store agent or resource profiles 138. An agent profile may contain various information pertaining to an individual agent, or alternatively a resource. A more detailed example of an agent profile will be described below in reference to FIG. 2.

Data storage service 122 may be an on-demand data storage service, such as an object-based data storage service that services API requests to store and retrieve data objects synchronously, and may be configured to store various forms of data and media, and other data structures generated and updated by the contact service 110 and the scheduling service 116. The data storage service 122 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. In some examples, data stored in the data storage service 122, may be organized into data objects, in one or more logical data containers. The data storage service 122 may include one or more data objects, which may have arbitrary sizes and may, in some instances, have constraints on size. Thus, the data storage service 122 may store numerous data objects of varying sizes. The data storage service 122 may operate as a key value store that associates data objects with identifiers of the data objects which may be used by the scheduling service 116 and/or the contact service 110 to retrieve or perform other operations in connection with the data objects stored by the data storage service 122. Access to the object-based data storage service 122 may be through application programming interface (API) calls to the service or via an interface, such as a graphical user interface (GUI). Access to the data storage service 122 may be through application programming interface (API) calls to the service, for example from client device 104 directly or through the computing resource service provider 102 and/or front end 108.

It should be appreciated that the data storage service 122 may additionally or alternatively provide non-object based data storage, such as block data storage, table-oriented data storage, relational databases, file-based storage, and the like. The data storage service 122 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost-effective storage class that may provide access with some delay, different redundancy, or other attributes.

The computing resource service provider 102 may also provide a contact service 110. The contact service 110 may be a collection of computing resources, including physical resources, virtual resources, or combinations thereof, configured to obtain, direct, and otherwise manage various communications streams from or between various computing devices, such as audio stream between an agent computing device 104 and various customers of the contact service 110. In some examples, the contact service 110 may provide automated or partially automated communications to computing devices, such as text or audio communications, to one or more computing devices 104. In some cases, contact service 110 may facilitate establishing and managing communication channels between various computing devices 104. In some cases, the contact service 110 may provide omnichannel communications. For example, text messaging or chat, voice contact, and/or video contact may be dynamically offered, based on such factors as customer preference and estimated wait times. The contact service 110, in some aspects, can integrate with one or more other services, to provide managed communication channels to users of the one or more services.

The contact service 110 may provide for a wide range of communication services to a variety of computing devices. In some examples, the contact service 110 may operate as a contact center, such as for one or more web-based businesses, retailers, etc. In other cases, the contact service 110 may provide communication services to any number of different organizations, such as health related organizations, retail, construction, legal services, etc. It should be appreciated that the techniques described herein have a broad range of applications, and that the above-mentioned use cases are only given by way of example.

In some aspects, the contact service 110 may include one or more control interfaces 112. The control interface may provide a GUI to a computing device or agent associated with the contact service 110, to aid in establishing and managing communication channels with client computing devices. In some cases, the control interface 112 may provide a dashboard to facilitate accessing customer data, such as one or more profiles linked to a specific customer or account. In yet some cases, the control interface 112 may provide a means for various agents and other entities associated with the contact service 110 to access agent schedules 134, 128, and/or rules and preferences 124, 126, such as to set constraints for the schedules and/or to modify preferences 126.

In some cases, the control interface/dashboard 112 may also provide an interface to facilitate managing various communication channels, various contact flows 130, and/or various queues 132. A contact flow 130 may encompass one or more menu options and routing directions (e.g., automated routing instructions) to respond to a customer inquiry, such as may be received from a computing device 104, in the form of a text or audio stream. A contact flow 130 may be contained in a data structure, which is processed when a communication channel is established, and may include different routing instructions, pointers to different audio recordings, text responses, and the like. In some cases, a contact flow 130 may include one or more automated responses, recorded menu offerings, etc., as will be appreciated by those having skill in the art. The contact service 110 may provide any number of different contact flows 130 to handle various customer inquiries.

The contact service 110 may also provide a number of different queues 132, to which issues and/or action items may be assigned. A queue 132 may be a storage location where an item or data structure is placed, typically temporarily, to be processed at a later time. The various queues 132 may be linked or associated with one or more contact flows 130, such that an action item may be placed in an appropriate queue 132 based on the action that needs to be taken to resolve or close the action. In some cases, the action to be taken may also correspond to a contact flow 130.

The computing resource service provider 102 may also provide a scheduling service 116. The scheduling service 116 may be a collection of computing resources, including physical resources, virtual resources, or combinations thereof, configured to generate one or more schedules for agents that are associated with the contact service 110. In some cases, the scheduling service 116 may interact with the front end 108, contact service 110, and/or data storage service 122 to provide schedule generation and modifying services. The scheduling service 116 may include a time decomposition process 118, a group decomposition process 120, and a schedule generator 136.

As described in more detail below, the time decomposition process 118 may be one or more processes or functions executed by the scheduling service 116 to break a schedule into multiple time periods to enable more efficient schedule generation. The time decomposition process 118 may determine a time window and modify shift placement within that time window to reduce constraints that span multiple time windows, to reduce the complexity of generating a schedule spanning multiple time periods. The group decomposition process 120 may be one or more processes or functions executed by the scheduling service 116 to separate out shifts having similar characteristics into different scheduling groups, to then enable parallel processing of adding activities to shifts and then assigning agents or resources to those shifts. The schedule generator 136 may be a collection of computing resources, including physical resources, virtual resources, or combinations thereof, configured to generate schedules, such as utilizing one or more of the time decomposition process 118 and the group decomposition process 120. The schedule generator 136 may utilize various mixed-integer linear programs (MIPs) and solvers to generate schedules, as is known in the art and as will be described in greater detail below.

The scheduling service 116 may have as inputs: the time period for the schedule, including start and end times, dates, etc. (e.g., October 1 to December 31); the minimum resource requirement or headcount per time interval (e.g., 15 minutes), as may be determined by a queuing model; and the legal and business rules affecting shifts and tours, including one or more of staffing group rules, shift profile rules, and agent rules. The scheduling service 116 may output a set of shifts, including start and end times (or other indication of when and for how long a shift starts and lasts), the placement of shift activities within each shift including productive and non-productive activities, and in some cases a roster of agents assigned to the shifts, that together form a schedule. In some cases, the output schedule may include up to 10000 agents, up to 1000 staffing groups, up to 30 distinct shift profiles per staffing group, and up to 10 different shift activities in a shift profiles. In addition, it is typical for contact services 110 to generate their schedules on a quarterly basis, meaning 13 weeks at a time at a 15-minute granularity (approximately 10000 individual intervals). It should be appreciated that the described scheduling service 116 may diverge from prior scheduling solutions in that it may be cloud based and not on-premise based. The described techniques are thus able to process large amounts of data and produce very large schedules spanning longer time periods, with more agents/units of a resource, and/or with more and/or more complex constraints.

In some examples, agent wages account for approximately 75% of the cost of running a contact center, so using their time efficiently is important to deliver a good experience for end customers while minimizing operational costs. At a high level, one goal of the described techniques is to minimize the cost of meeting user-defined targets throughout the scheduling, period, including service level, average speed of answer, and occupancy. For the purposes of scheduling, it is assumed that the service level targets have already been translated into a minimum headcount number per time period (e.g., 15-minute interval) by a capacity planning system. For ease of description, it is assumed that agents are all paid a comparable wage. Thus, a goal of the described techniques can be restated as to minimize the total agent working hours to meet minimum headcount requirements at intervals throughout the day. The main levers which can be controlled to generate the optimal schedule are shift start/end times and shift activity placement. These are constrained by a myriad of rules specified by the customer, including legal rules, business rules, and policies. An efficient schedule should meet peak demand while not over-staffing outside of peak.

Figure 2:
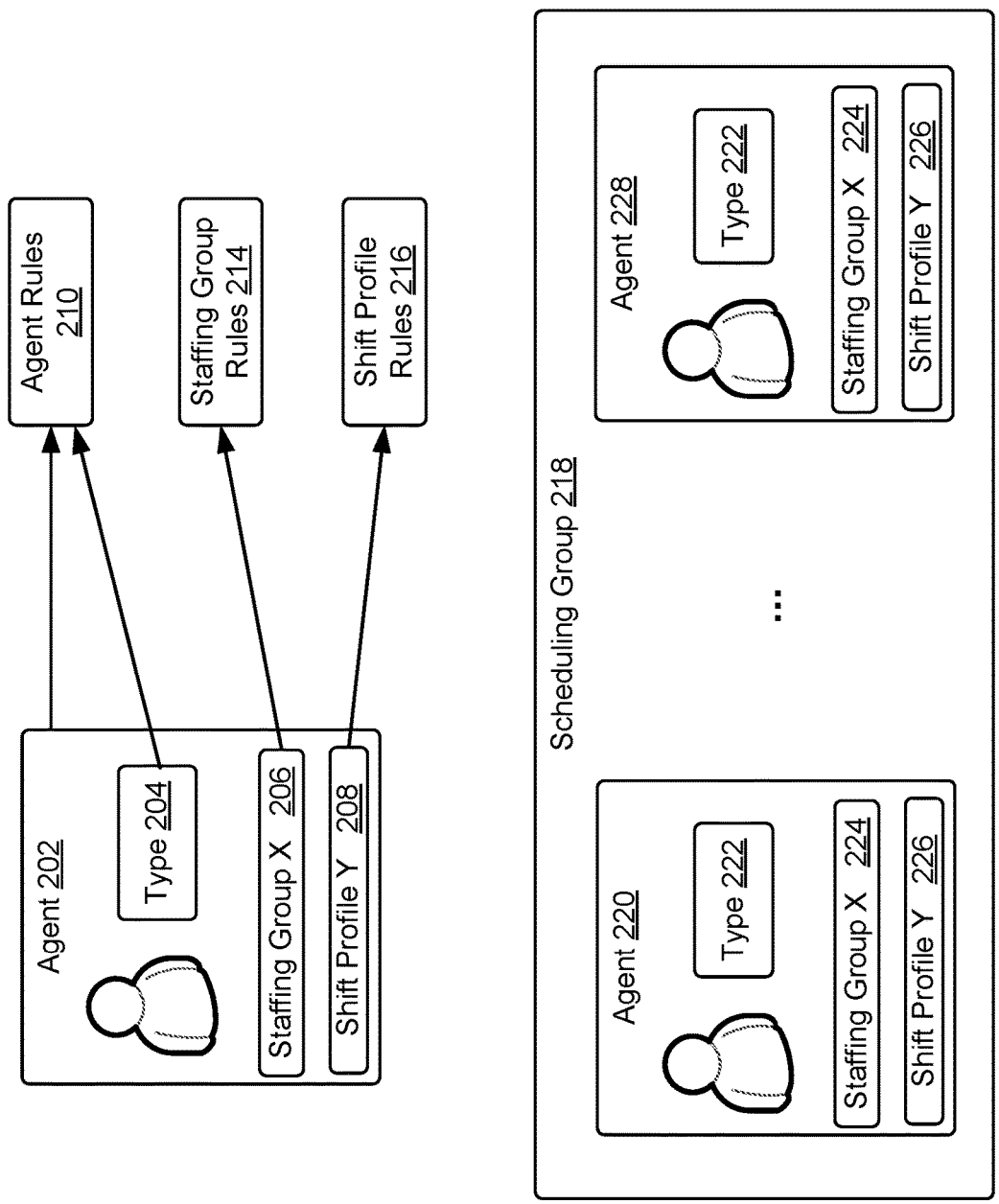
FIG. 2 illustrates an example diagram of data structures that represent how an agent can be assigned different attributes and assigned to different scheduling, according to at least one embodiment.

FIG. 2 illustrates an example diagram 200 of data structures that represent an agent profile 202 and a staffing group 218, which may be used by the scheduling service 116 and/or contact service 110 to generate schedules, as described above in reference to FIG. 1. Agent profile 202 may be an example of agent profile 138 described above in reference to FIG. 1.

As illustrated, an agent profile 202 may include various attributes, such as a type 240, an assigned staffing group 206, and a shift profile 208. Various rules may apply to the agent, such as agent level rules 210 (e.g., hours minimum and/or maximum limits, type of work the agent can performed, etc.), staffing group rules 214, which may apply to a group of agents having similar characteristics. In some examples, a staffing group rule may include a maximum number of hours for full time agents (e.g., 40 hours/week) and a maximum number of hours for part time agents (e.g., 25 hours/week). In addition, shift profile rules 216 may apply to shift profiles (e.g., a certain number of breaks and a duration of those breaks for agents, break information for part time versus full time agents, and so on). It should be appreciated that rules 210, 214, and 216 are just given by way of example and represent the concept that rules can be applied at various levels and may include a variety of constraints or limitations on scheduling agents and or resources.

In the contact center example, agents 202 in large contact centers may be divided along a few axes. Broadly speaking, they are divided into staffing groups 206 based on what they can work on and when they can work. Agents within a staffing group 206 typically respond to the same types of contacts and are typically co-located. Within each staffing group 206 is one or more shift profiles 208. A shift profile 208 specifies the earliest possible start time and latest possible end time of shift. For example, there might be three shift profiles: a morning shift that starts as early at 4:00 and ends as late as 17:00, an afternoon/evening shift which starts as early as 13:00 and ends as late as 1:00, and a graveyard shift which starts as early as 19:00 and ends as late as 8:00. Rules 214, 216 set at the staffing group level and the shift profile level apply to all agents contained therein. Rules can also be set at the agent level 210. For example, the maximum weekly hours of a single agent 202 is set at the agent level. Agents with the same type 204 have the same agent-level rules 210. For example, part-time agents may have a maximum weekly hours of 20 while full-time agents have a maximum weekly hours of 40. If two agents are in the same staffing group 206 and have the same shift profile 208 and type 204, then they are fully interchangeable: any schedule which works for one will work for the other (barring any mismatched time-off requests). As described herein, a scheduling group 218 consists of all agents 220 to 228, in the same staffing group 224 with the same shift profile 226 and type 222.

Figure 3:
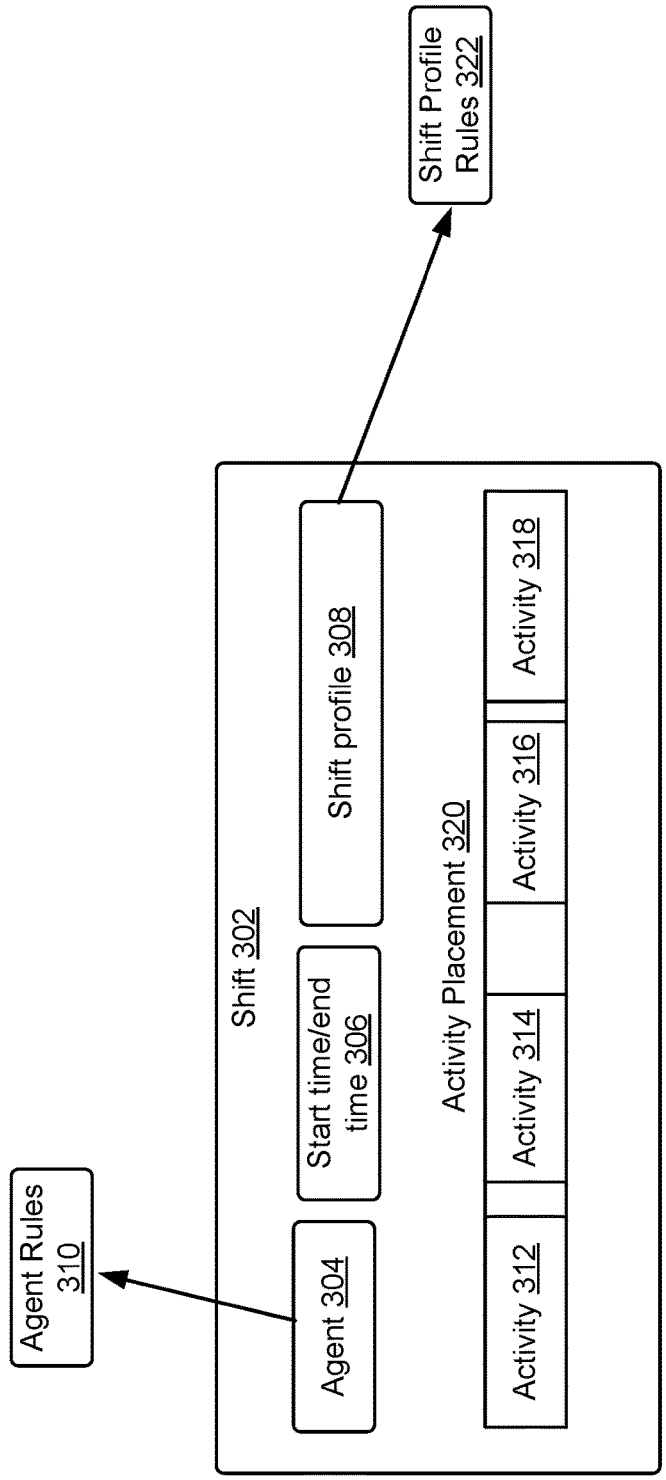
FIG. 3 illustrates an example data structure that represents a rostered shift, according to at least one embodiment.

FIG. 3 illustrates an example data structure that represents a rostered shift 300, which may be used by the scheduling service 116 and/or contact service 110 to generate schedules, as described above in reference to FIG. 1. As used herein, an empty shift has an assigned start and end time 306 and shift profile 308, but no activity placement 320, and no attached agent. An unrostered shift has an assigned start and end time 306, as well as activity placement 320 and shift profile 308, but no attached agent. Finally, a rostered shift has everything: start time and end time 306, shift profile 308, activity placement 320, and an agent 304. A set of shifts which are linked together, usually because they are rostered to the same agent (or intended to be rostered to the same agent), is referred to as a tour. An activity placement 320 may define at what times during a shift, certain activities 312, 314, 316, 318 have been assigned. As illustrated, the boxes 312-318 may represent certain activities or productive periods and their duration, whereas the spaces in between may represent breaks or non-productive activities or periods.

Figure 4:
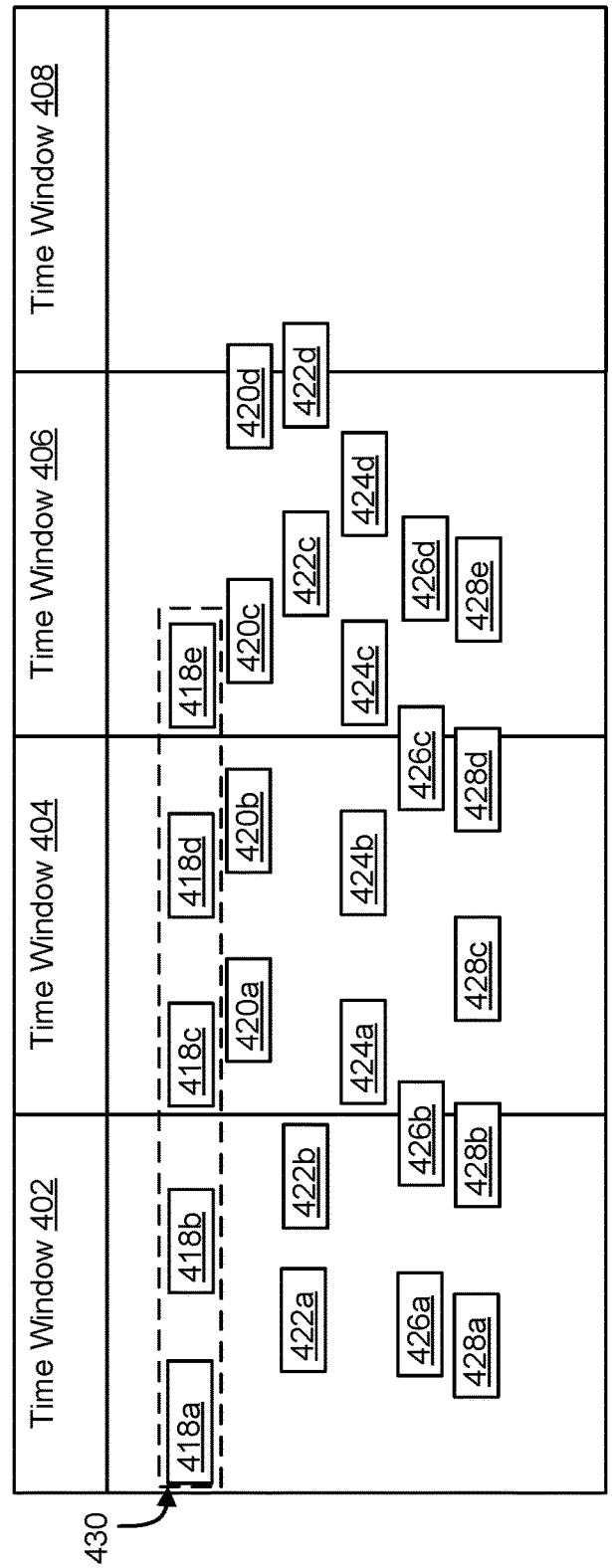
FIG. 4 illustrates an example diagram of a schedule, including a number of shifts, that is broken into a number of time windows, according to at least one embodiment.

FIG. 4 illustrates an example diagram of a schedule 400, including a number of shifts 418-428, that is broken into a number of time windows 402-408. Schedule 400 may be generated by the scheduling service 106, as described above in reference to FIG. 1.

As illustrated, various shifts 418a-e, 420a-d, 422a-d, 424a-d, 426a-d, and 428a-e may be represented in diagram 400, which represents time. The total time is divided into a number of time windows 402-208, which may be of a variety of lengths. As also illustrated, multiple shifts assigned to the same agent or resource, such as shifts 418as-e, may form a tour 430. As discussed above, it may be useful to break a scheduling problem into different time windows, to facilitate more efficient and/or less complex generation of schedules, which may include a large number of agents and shifts (e.g., 100 to 1000s). As described above, a time decomposition process 118 may split a time period for a schedule up into different time windows, such as time windows 402-408. However, in cases where a shift spans across multiple time windows, such as shifts 420d, 422d, 426b, 426c, 428b, and 428d, it may add more complexity to solve for the various shifts as these may add complicating constraints to solve for.

When solving very large mixed-integer programs, it is helpful to look for block structure: a way to partition the variables such that almost all of the constraints involve variables from only one set in the partition. Constraints which include variables from multiple sets in the partition are called shared constraints or complicating constraints. In optimization problems with temporal components, looking for block structure along the time axis is a natural choice. Unfortunately, naively dividing the MIP by week results in a lot of complicating constraints, especially in contact centers that operate 24 hours, 7 days per week. If weeks are defined as being Sunday through Saturday, some shifts which start during one week (Saturday late night) might end during the next week (Sunday early morning). This means that most of the constraints affecting these overnight shifts are complicating constraints.

To solve this issue, the underlying mixed-integer linear program may be modified to assume that weeks are cyclic. For example, given a week from May 2 (Sun) to May 8 (Sat), then it can be assumed that shifts which start on May 8 at night will wrap around and meet demand on May 2 in the morning. There may still be complicating constraints, but significantly fewer. Each individual shift only belongs to one sub-problem, so the only complicating constraints are those which dictate how shifts are combined across several weeks. For example, the maximum number of consecutive days that an agent can work or the total number of hours an agent can work in a month.

This assumption works particularly well if the week-over-week headcount requirement does not experience large discontinuities. For example, if the headcount requirements early in the morning on May 2 are similar to the headcount requirements early in the morning on May 9. If there is a large increase in headcount requirement week over week, then the schedule will end up slightly understaffed on May 9. If there is a large decrease in headcount requirement week over week, then the schedule will end up slightly overstaffed on May 9.

In some aspects, the risk imposed by this assumption may be reduced. In particular, the weekly discontinuity can be strategically placed at a time with especially low volume, or an additional pre-processing step may be added where significant headcount fluctuations week over week may be detected, and the start time for the period modified to align with low points in the headcount requirements.

Figure 5:
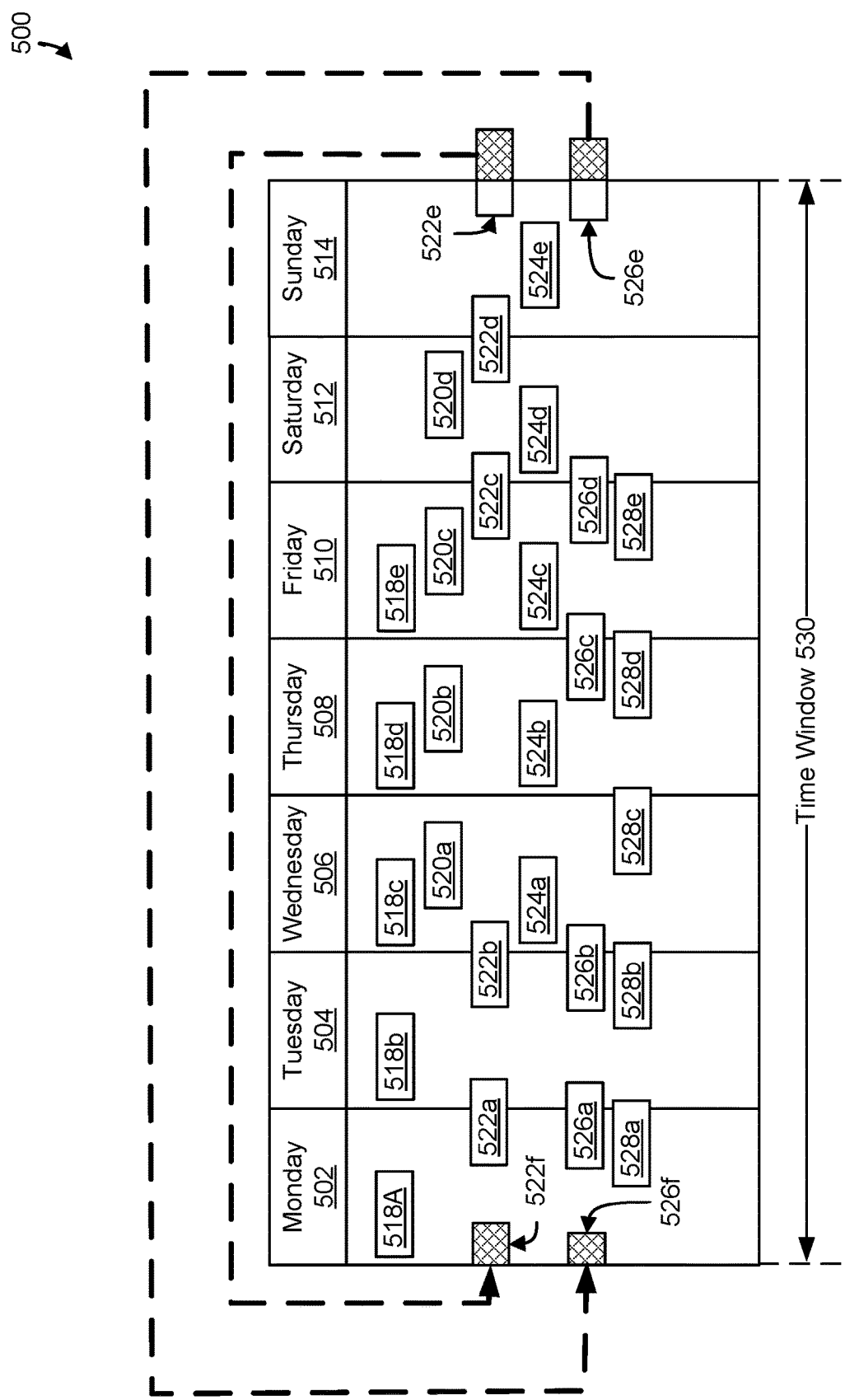
FIG. 5 illustrates an illustrates another example diagram of a schedule, including a number of shifts, that is broken into a number of time windows, according to at least one embodiment.

FIG. 5 illustrates another example diagram of a schedule 500, including a number of shifts 518-528, that are scheduled across days 502-514 that make up a time window, such as any one of time windows 402-408 described above in reference to FIG. 4. Schedule 500 may be generated by the scheduling service 106, as described above in reference to FIG. 1. In this example, using the time distortion or approximation techniques described herein, a time shift that extends past time window 500, such as time shifts 522e and 526e, may be approximated as continuing through to the beginning of time window 500, such as illustrated as partial shifts 522*f* and 526*f*. In this example, the time of shift 522*e* and 526*e* that extends past the end of time window 530 may be allocated to the beginning of time window 530 as partial shifts 522*f* and 526*f*. In this way, shifts may be allocated, assigned activities, and rostered for individual time windows 500, with reduced complexity. Multiple time windows may be processed in kind concurrently or in parallel, thus resulting in a complex and potentially very large schedule being generated more quickly without much loss in accuracy and able to satisfy any of a number of constraints placed on the schedule, or agents thereof.

Figure 6:
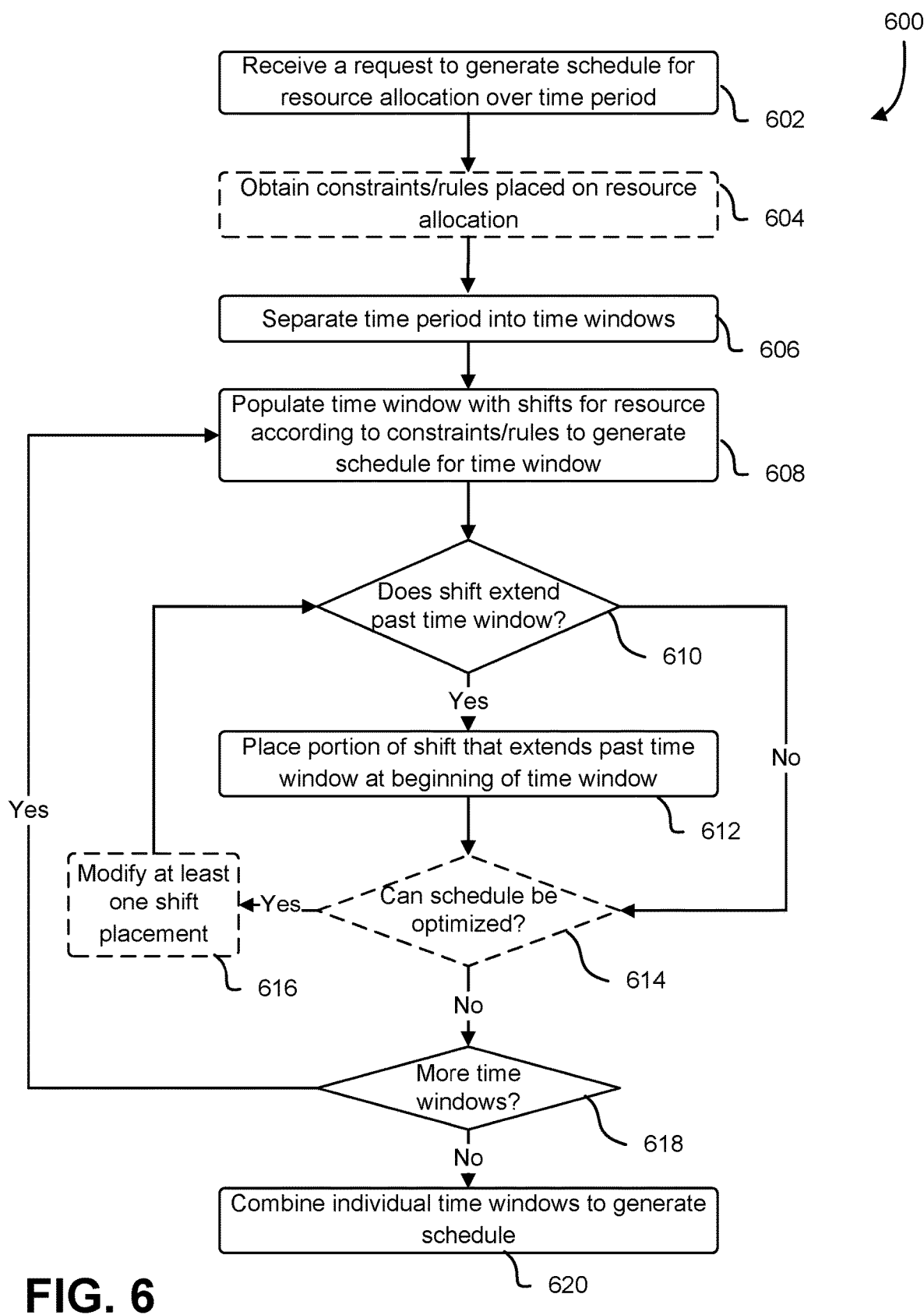
FIG. 6 illustrates an example process for decomposing a schedule into smaller time windows, according to at least one embodiment.

FIG. 6 illustrates an example process 600 for decomposing a schedule into smaller time windows. In some cases, process 600 may be performed at least in part by a contact service 110, scheduling service 116, and/or components thereof, such as the time decomposition process 118, and/or schedule generator 130, as described above in reference to FIG. 1. As illustrated in FIGS. 6-9, dotted lines may indicate optional operations such that the process 600-900 may be performed with or without the optional operations.

Process 600 may begin at operation 602, in which a request to generate a schedule for resource allocation over a time period may be received. In some cases, the resource allocation may include allocation of various resources, such as computing resources, including processing capacity, memory capacity, virtual machine portions or complete virtual machines, or software containers. In other cases, as described above, the resources maybe human or agent resources, such as may include a pool of agents ready to be assigned shifts (hours of work) to process a workload (e.g., respond to contact center communications). Next at operation 604, constraints and/or rules relating to the resource allocation may be obtained. The constraints or rules may include various constraints put on operation of the resource, such as duration of activity for computing resources or hours for human resources or agents (e.g., one or more restrictions on a number of hours agents of the plurality of agents are scheduled to work during at least a portion of the time period). In some cases, the constraints or rules may include any of agent rules 210, 310 staffing group rules 214, and/or shift profile rules 216, 322 described above in reference to FIGS. 2 and 3. In some cases, one or more constraints to be placed on scheduling shifts may be determined based on other constraints of units similar to the plurality of units of the resource.

At operation 606, the time period for which the schedule is be generated may be split up or decomposed into time windows. In some cases, the time windows may be of equal length. In other cases, the length of individual times windows may vary. In one specific example, the time windows may be the duration of a calendar week or a multiple thereof, such as 2, 3, or 4 weeks, and the like. In some cases, decomposing the schedule spanning the time period into a plurality of time windows is based on contact volume patterns associated with a contact center service. In other examples, the length of the time windows may be selected based on a determined period in which at least one characteristic associated with the schedule or the plurality of units repeats. The at least one characteristic may include a characteristic of resource usage, resource or shift activity placement, resource longevity and output over extended periods of time, and so on.

In yet some cases, at least one of: a length of individual time windows of the plurality of time windows; a start time of individual time windows of the plurality of time windows; or an end time of individual time windows of the plurality of time windows is selected to reduce a number of the at least one constraints (e.g., complicating constraints) that are shared between at least two time windows of the plurality of time windows. In some cases, at least one of: a length of individual time windows of the plurality of time windows; a start time of individual time windows of the plurality of time windows; or an end time of individual time windows of the plurality of time windows is selected to correspond to a decrease in demand for the plurality of units of the resource/the minimum headcount in the case of agents.

At operation 608, a selected time window may be populated with shifts for the resource according to or satisfying the constraints or rules to generate a schedule for the time window. Operation 608 may include assigning a start time, duration, and/or end time within the time period for a given resource to be available to perform work or tasks. In some cases, a shift may include hours that an agent is working or responding to communications received by the contact center service. In some cases, a shift may include one or more attributes of shift 302, as described above in reference to FIG. 3, including a shift profile 308 and/or activity placement 320. In some aspects, populating the individual time window with the plurality of shifts of the number of shifts is performed using a mixed-integer linear program solver to produce a schedule for the individual time window.

Process 600 may then continue to operation 610, in which it may be determined if a shift within the time window extends past that time window (e.g., would normally extend to the next time window). If the outcome is negative, process 600 may proceed to operation 614. If the outcome of operation 610 is positive, then a portion of the time the shift occupies may be distorted, such that the portion of the shift that extends past the time window may be assigned to a time within the time window (e.g., at the beginning of the time window), at operation 612. In some cases, operation 610 may include allocating or scheduling a first time within the individual time window for at least one shift of the number of shifts that extends past that individual time window by a second time by placing the second time at the beginning of the individual time window. In other cases, the time that extends outside the time window may be placed or allocated to a different place within the time window, such as at the end (e.g., so the shift occupies at least a portion of the same time at the end of the shift), or in the middle of the time window.

Process 600, optionally, may continue to operations 614 following completion of operation 612, where it may be determined if the schedule can be optimized. If yes, then at least one shift placement may be modified, at operation 616. In some cases, at least one shift placement modification may include a changing at least one of a start time, end time, hours of operation (e.g., a window of time in which an agent can work), duration (length of shift), and activity placement within the shift, adding a new shift, or deleting an existing shift. In some cases, operations 614 and 616 may be performed to reduce understaffing or under-allocating resources, or overstaffing or over-allocating resources based on the minimum headcount or minimum resources for the workload, as may be defined by one or more constraints and/or the workload itself. Upon completion of operation 616, process 600 may loop back to operation 610, to modify any shift placements that extend past the time window.

Upon a negative determination at operation 614, process 600 may proceed to operation 618, in which it may be determined if there are more time windows in the time period for which the schedule is being generated. If yes, then process 600 may loop back through operations 608-618 until no more time windows are available, at which point the schedules for the individual time windows may be combined to form a primary schedule, at operation 620. In some cases, operation 620 may include modifying at least one shift of the individual time windows to satisfy at least one constraint in generating the schedule spanning the time period. In process 600, it should be appreciated that operations 608-616 may be performed in series or in parallel, as described in greater detail below in reference to FIG. 7.

Figure 7:
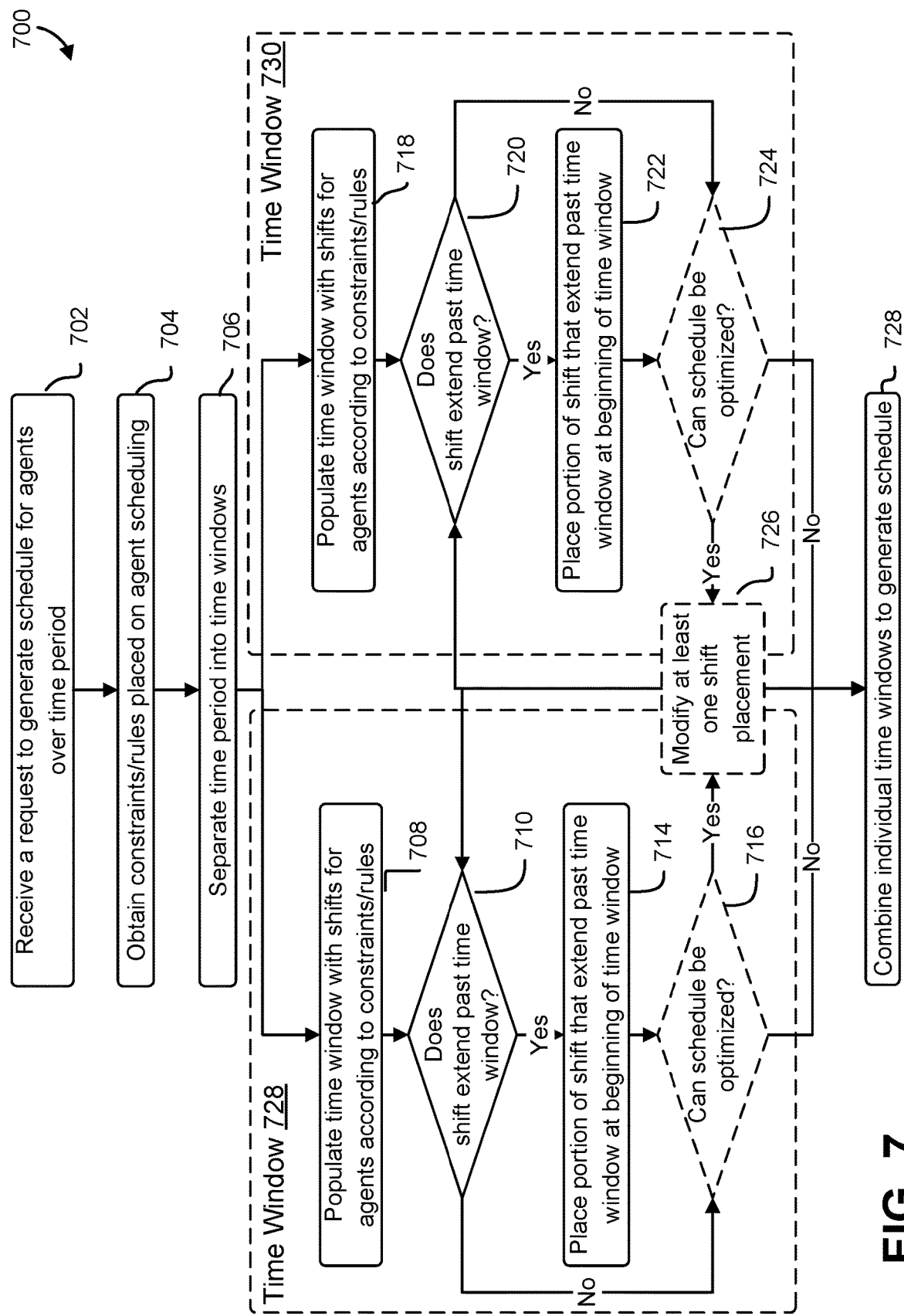
FIG. 7 illustrates another example process for decomposing a schedule into smaller time windows, according to at least one embodiment.

FIG. 7 illustrates another example process 700 for decomposing a schedule into smaller time windows. In some cases, process 700 may be performed at least in part by a contact service 110, scheduling service 116, and/or components thereof, such as the time decomposition process 118, and/or schedule generator 130, as described above in reference to FIG. 1. Many of the operations of process 700 may share aspects of similar operations of process 600 described above in reference to FIG. 6, and for the sake of brevity, will not described in detail again here.

Process 700 may begin at operation 702, in which a request to generate a schedule for agents over a time period may be received. In some cases, the schedule may be defined by a set of shifts for a plurality of agents. Next at operation 704, constraints and/or rules relating to the agent allocation or schedule may be obtained. The constraints or rules may include various constraints put on operation of the resource, such as duration of activity for computing resources or hours for human resources. In some cases, the constraints or rules may include any of agent rules 210, 310 staffing group rules 214, and/or shift profile rules 216, 322 described above in reference to FIGS. 2 and 3.

At operation 706, the time period for which the schedule is be generated may be separate out or decomposed into time windows. In some cases, the time windows may be of equal length. In other cases, the length of individual times windows may vary. In one specific example, the time windows may be the duration of a calendar week or a multiple thereof, such as 2, 3, or 4 weeks, and the like. Process 700 may proceed to different groups of operations 728, 730 for individual time windows determined at operation 706. The operations in operational groups 728, 730 may be performed concurrently (e.g., where at least some performance of the operation overlaps between time windows 728, 730), in parallel (e.g., at least one of starting or ending at the same time), or at different unrelated times between the different groups 728, 730. In some cases, more than 2 time windows 728, 730, (e.g., up to the total number of time windows generated or separated in operations 706) may be processed concurrently or in parallel.

Each of the time windows 728, 730 may include one or more of operations 708-726, and 718-726, respectively. At operation 708, 718 a time window may be populated with shifts for agents according to or satisfying the constraints or rules to generate a schedule for the time window. Operation 708, 718 may include assigning a start time, duration, hours of operation, and/or end time within the time period for a given agent to be available to perform work or tasks. In some cases, a shift may include one or more attributes of shift 302, as described above in reference to FIG. 3, including a shift profile 308 and/or activity placement 320. Next, at operation 710, 720 it may be determined if a shift within the time window extends past that time window (e.g., would normally extend to the next time window). If the outcome is negative, process 700 may proceed to operation 716, 724. If the outcome of operation 710, 720 is positive, then a portion of the time the shift occupies may be distorted, such that the portion of the shift that extends past the time window may be assigned to a time within the time window (e.g., at the beginning of the time window), at operation 714, 722. In some cases, operation 714, 722 may include allocating or scheduling a first time within the individual time window for at least one shift of the number of shifts that extends past that individual time window by a second time by placing the second time at the beginning of the individual time window. In other cases, the time that extends outside the time window may be placed or allocated to a different place within the time window.

Process 700, optionally, may continue to operation 716, 724 (e.g., for each time window) following completion of operation 714, 722, where it may be determined if the schedule can be optimized. If yes, then at least one shift placement may be modified, at operation 726. In some cases, operations 714, 722, and 726 may be performed to reduce understaffing, or overstaffing based on the minimum headcount requirement for the workload, as may be defined by one or more constraints and/or the workload itself. Upon completion of operation 726, process 700 may loop back to operations 710, 720 depending on which time window is determined to be optimized. Upon a negative determination at operation 716, 724, process 700 may proceed to operation 728, at which point the schedules for the individual time windows may be combined to form a primary schedule. In some cases, a similar optimization as may be performed at operations 716, 724, and 726 may be performed after operation 728 for the primary schedule.

In formulating techniques to decompose scheduling problems into groups, a distinction may be made between implicit and explicit shift representations. Explicit representations are when the MIP includes a separate binary variable for each shift and each start time. Explicit representations allow for slightly more expressive MIPs. On the other hand, implicit representations include an integer variable for the number (count) of shifts starting at each start time. These integer variables can be thought of as the sum of the binary variables in an explicit representation. The advantage of implicit formulations is that they can typically be solved faster, especially when the underlying MIP has a lot of symmetry.

One risk in the described scheduling techniques is creating a schedule which is difficult or impossible to roster. This is because individual shifts are generated initially, and then they are combined into tours while rostering. In some cases, rostering assumes the mathematical structure of a generalized assignment problem. However, if there is little gap between the weekly minimum and maximum work hours each agent (for example, if every agent must work exactly 40 hours per week), the problem instead resembles a bin packing problem, where the agents are bins and the shifts are being packed into them. In some cases, the concept of scheduling tours may be introduced early in the process. In some cases, to mitigate this risk, constraints may be introduced in the earlier steps of scheduling, which may be necessary conditions for the schedule to be rosterable. However, in some cases, the conditions may not be sufficient. For example, if the rostering phase will consist of 10 agents each working at least 35 hours per week and at most 40 hours per week, then at most 10 shifts may be created per day and at least 350 and at most 400 hours of work per week. These conditions do not guarantee that the schedule can be rostered, but they are necessary for the schedule to be fully rostered.

In Step 1, empty shifts are created. This operation allows the total headcount requirement to be divided into a headcount by scheduling group requirement, thereby separating the overall scheduling problem into separate sub-problems by scheduling group. In some cases, the separate sub-problems can be solved in parallel. In a sense, Step 1 represents a scheme for partitioning the problem into sub-problem by scheduling group. In some cases, the shift profiles of the scheduling groups do not overlap and the division may not provide as many benefits. In other cases, the shift profiles overlap and these parallelization operations are important. For example, if the day shift is from 6:00 to 23:00 and the night shift is from 13:00 to 6:00, then there is overlap from 13:00 to 23:00. In some implementations, start/end times may not be carried over between operations 810 and future operations, such as operations 812 and 814.

To group units or agents into scheduling groups to meet the workload/headcount requirements, in some cases, the shift profiles can be modeled coarsely, ignoring some of the nuances of shift activities. In lieu of explicitly modeling shift activities, a real value may be assigned between 0 and 1 representing the fraction of the interval that the agent is expected to be productive. Non-productive activities are amortized across the entire window where they could be scheduled. For example, a four-hour shift with a 30-minute break in the second or third hour will be represented by the vector $$I = \left( \underbrace{1, 1, 1, 1}_{hour1}, \underbrace{0.75, 0.75, 0.75, 0.75}_{hour2}, \underbrace{0.75, 0.75, 0.75, 0.75}_{hour3}, \underbrace{1, 1, 1, 1}_{hour4} \right)$$

because the agent is expected to be productive for 75% of the time in the second and third hour (90 minutes out of 120 minutes). This vector may be referred to as the shift shape. Using the amortized representation of shifts, the problem becomes one of covering the minimum headcount with well-placed shifts. Mathematically, this has the structure of a covering problem. For example, given shifts with the pattern I=(1; 0.5; 1) with five intervals of demand to cover (5; 10; 15; 20; 15), the 5 shifts can be started in the first interval, 13 shifts in the second interval, and 15 shifts in the third interval. The resulting coverage would be:

5·(1,0.5,1,0,0)+13·(0,1,0.5,1,0)+15·(0,0,1,0.5,1)=(5, 15.5,26.5,20.5,15)≥(5,10,15,20,15).

To represent this problem as a mixed-integer linear program (MIP), we use the sets G (scheduling groups) and T (time blocks). The variables are:
Decision Variables
  $e_{g,t,t'} \in \mathbb{Z}^+$ the number of shift of scheduling group g starting time at time t and ending at time t'.
Implied Variables
  $s_{g,t} \in \mathbb{Z}^+$ the number of shifts of scheduling group g starting at time t.
  $h_{g,t} \in \mathbb{Z}^+$ the headcount of scheduling group g starting at time t.

The formulation below only includes constraints which give insight into the "key ideas." Other constraints, such as restricting certain start/end times or requiring all shifts in some groups to start at the same time, are driven by business rules and may not affect the core structure of the problem. The objective is to minimize the total headcount:

$$\min \sum_{g \in G, t \in T} h_{g,t} \qquad (5.1)$$

Define the implied variables in terms of the decision variables:

$$s_{g,t} = \sum_{t' \in T} e_{g,t,t'} \qquad \forall g \in G, i \in T \qquad (5.2)$$

$$h_{g,t} = \sum_{t' < t < t''} I[t - t'] \cdot c_{g,t',t''} \qquad \forall g \in G, i \in T \qquad (5.3)$$

Meeting the coverage requirements:

$$\sum_{g \in G} h_{g,t} \geq MinHeadcountRequirement[t] \qquad \forall t \in T \qquad (5.4)$$

Ensuring necessary conditions for the rostering stage:

$$\sum_{t \in D} s_{g,t} <= DailyMaxShiftsPerGroup[g] \qquad \forall g \in G, D \subseteq T \qquad (5.5)$$

$$\sum_{t \in T} s_{g,t} <= TotalMaxShiftsPerGroup[g] \qquad \forall g \in G \qquad (5.6)$$

$$\sum_{t \in D} e_{g,t,t'}(t' - t) <= DailyMaxHoursPerGroup[g] \qquad \forall g \in G, D \subseteq T \qquad (5.7)$$

$$\sum_{t \in D} e_{g,t,t'}(t' - t) <= TotalMaxHoursPerGroup[g] \qquad \forall g \in G \qquad (5.8)$$

If the MIP is infeasible, constraint (5.4) may be relaxed. Without it, the null schedule is a feasible solution, so infeasibility is no longer a danger in the relaxed problem. When an infeasible problem is detected, goal programming may be implemented: first, violation of constraint (5.4) may be minimized, then the optimal objective (5.1) may be found subject to minimum violation of constraint (5.4).

In some cases, a number of changes to this stage of the model may be implemented. There are very few restrictions on the pairs (t, t') that define the variables $e_{g,t,t'}$. This may result in shifts that last for non-integer nor fractional hours (e.g., 8.25 hours). This can be modified by adding pre-processing to only take relevant values of (t, t'). In some implementations, a few simple break placement rules are supported, such as placement from the beginning or end of a shift. In other implementations, more complex break rules can be supported, such as placing breaks relative to one another. In yet some cases, structures can be implemented to support tours of shifts that have shifts that have a consistent start time, such as by using delayed column generation.

In Step 1, empty shifts are created for each scheduling group and workload (headcount) is allocated accordingly. In Step 2, concrete decisions about activity placement may be made. Although start times were suggested in Step 1, Step 2 may change those start times. Because the headcount was divided by shift profile, Step 2 can be solved in parallel for each scheduling group. Looking at the scheduling problem naively, one might assume that break placement is relatively unimportant. As long as the placement of breaks adheres to labor laws, the breaks may be placed with a simple heuristic. In other cases, optimal break placement can be quite important. This is exemplified by the "lunch problem": when all the agents have to take 30-minute lunches in a relatively short window of time, a contact center that is normally well-staffed may end up dramatically under-staffed during lunch and create a call backlog that lasts into the afternoon. Mathematically, the MIP formulation used in this step utilizes and generalizes upon an idea called implicit break scheduling. Rather than placing every break, it can be determined how many agents will take breaks in each interval. The actual assignments of breaks to shifts is done in a post-processing step. In some cases, a greedy algorithm may be applied for this post-processing.

To represent the problem as a mixed-integer linear program (MIP), the following variables may be used:

Decision Variables $e_{t,t'} \in \mathbb{Z}^+$=the number of shifts that start at time t and end at time t'.

$b_{t,t'',r} \in \mathbb{Z}^+$=the number of shifts that start at time t and have activity r at time t''.

Implied Variables $s_t \in \mathbb{Z}^+$=the number of shifts starting at time t.

$g_{t,t''} \in \mathbb{Z}^+$=the number of shifts that started at time t and are ongoing at time t''.

$b_{t,t''} \in \mathbb{Z}^+$=the number of shifts that start at time t and have activity at time t''.

$h_t \in \mathbb{Z}^+$=the effective headcount at time t.

As before, for clarity of presentation, only the constraints which capture the crux of the problem structure are presented below. The objective is to minimize the total headcount:

$$\min \sum_{t \in T} h_t \quad (6.1)$$

Constraint which defines the relation among the decision variables:

$$e_{t,t'} = \sum_{t < t'' < t'} b_{t,t'',r} \quad (6.2)$$

Constraints which define the implied variables in terms of the decision variables:

$$s_t = \sum_{t' \in T} e_{t,t'} \quad \forall\, t \in T \quad (6.3)$$

$$g_{t,t''} = g_{t,t''-1} - e_{t,t''} \quad \forall\, t \in T \quad (6.4)$$

$$b_{t,t''} = \sum_{r \in R} b_{t,t'',r} \quad (6.5)$$

$$h_{t''} = \sum_{t \in T} g_{t,t''} - \sum_{t \in T} \sum_{r \in R} b_{t,t'',r} \quad \forall\, t'' \in T \quad (6.6)$$

The coverage requirements need to be met:

$$h_t \geq \text{MinHeadcountRequirement}[t] \quad \forall\, t \in T \quad (6.7)$$

Let $e_r$ and $L_r$ denote the earliest and latest possible relative placement of activity r, respectively. For activities which are placed relative to the start of the shift, the values of $e_r$ and $L_r$ are positive:

$$g_{t,l+e_r} = \sum_{t''=t+e_r}^{l+\ell_r} b_{t,t'',r} \quad \forall\, t \in T, r \in R \quad (6.8)$$

For activities which must be placed relative to the end of the shift, the values of $e_r$ and $L_r$ are negative. Let $\mu$ be the minimum possible duration of the shift and let M be the maximum possible duration:

$$s_t = \sum_{t''=t+\mu+e_r}^{t+M+\ell_r} b_{t,t'',r} \quad \forall\, t \in T, r \in R \quad (6.9)$$

$$e_{t,t'} \leq \sum_{t''=t'+e_r}^{t'+\ell_r} b_{t,t'',r} \quad \forall\, t \in T, t' \in T, r \in R \quad (6.10)$$

$$\sum_{t''=t+\mu}^{t'} e_{t,t'} \leq \sum_{t''=t+\mu+e_r}^{t'+\ell_r} b_{t,t'',r} \quad \forall\, t \in T, t' \in T, r \in R \quad (6.11)$$

Activities occur when the shift is ongoing:

$$\sum_{r} b_{t,t'',r} \leq g_{t,t''} \quad \forall\, t \in T, t'' \in T, r \in R \quad (6.12)$$

Conditions (in some cases necessary) for the rostering stage:

$$\sum_{t \in D} s_t \leq \text{DailyMaxShiftsPerGroup}[g] \quad \forall\, D \subseteq T \quad (6.13)$$

$$\sum_{t \in T} s_t \leq \text{TotalMaxShiftsPerGroup}[g] \quad (6.14)$$

$$\sum_{t \in D} e_{t,t'}(t'-t) \leq \text{DailyMaxHoursPerGroup}[g] \quad \forall\, D \subseteq T \quad (6.15)$$

$$\sum_{t \in T} e_{t,t'}(t'-t) \leq \text{TotalMaxHoursPerGroup}[g] \quad (6.16)$$

The post-processing step of implicit scheduling MIPs can be handled in a variety of ways, from greedy algorithms to network ow formulations. In some examples, an easy greedy algorithm is used. For all the shifts that start at time t, they can be sorted by endtime. For each break, the earliest break remaining may be greedily assigned to the earliest shift and recurse until all breaks have been assigned to all shifts. The resulting shifts have the desirable property that shifts with earlier end times have earlier breaks.

In some cases, such as to support complex break rules, moving from an implicit model to an explicit one may be beneficial. This may include resolving some or more start and end times in Step 1 versus waiting until Step 2. In some cases, an implicit model is used in Step 2. By switching to an explicit model, more sophisticated constraints could be modeled, but at the cost of creating a MIP that would likely take more time to solve.

The final scheduling step is rostering, where agents are matched to shifts. The assignment of agents to shifts implicitly creates tours, where all the shifts assigned to the same agent constitute a tour. To complicate matters, there are several ways to roster their shifts. One way includes manual rostering, where a practitioner may choose to roster tours manually, either by a supervisor or by letting agents pick their tours on a first-come, first-served basis. In this case, Step 3 may be performed with placeholder agents in order to link together daily shifts into tours. Another way includes automatic rostering, where a practitioner may choose to have the shifts rostered automatically. Typically, agents will express a general preference (ex. earlier shifts vs later shifts) or a specific preference (ex. shift bidding). Agents with better performance or longer tenure are given high priority and are therefore more likely to be assigned shift they prefer in their tour.

To represent the problem as a mixed-integer linear program (MIP), the following variables may be used:

Decision Variables $x_{a,s} \in \{0,1\}$=binary indicator if agent a is assigned to a shift in shift group s.

Implied Variables $y_a \in \{0,1\}$=binary indicator if agent a is assigned any shifts.

As before, for clarity of presentation, only the constraints which capture the crux of the problem structure are illustrated below. Let $r_{a,s}$ be the reward for rostering agent a to shift s. The objective is to minimize the number of agents needed while maximizing reward. This can be accomplished this using goal programming, where objective (7.1) may be maximized objective (7.2) minimized subject to attaining the maximum reward:

$$\max \sum_{a \in A, s \in S} r_{a,a} x_{a,s} \quad (7.1)$$

$$\min \sum_{a \in A} y_a \quad (7.2)$$

Constraints which define the implied variables in terms of the decision variables:

$$x_{a,s} \leq y_a \quad \forall a \in A, s \in S \quad (7.3)$$

For various reasons, some agents may be ineligible to roster certain shifts:

$$\sum_{s \in S, a, s} x_{a,s} = 0 \quad \forall a \in A \quad (7.4)$$

An agent cannot be rostered to two shifts which overlap:

$$\sum_{s \in S | st'' \neq 0} x_{a,s} \leq 1 \quad \forall a \in A, t \in t \quad (7.5)$$

Let d(s) be the duration of shift s. This constraint ensures that agents do not exceed their weekly maximum hours of work:

$$\sum_{s \in S} d(s) x_{a,s} \geq MinWeeklyHours[a] \quad \forall D \subseteq T \quad (7.6)$$

$$\sum_{s \in S} d(s) x_{a,s} \geq MaxWeeklyHours[a] \quad \forall D \subseteq T \quad (7.7)$$

In some aspects, shifts are not combined into tours until Step 3. This poses some risk, since constraint (7.6) and constraint (7.7) can turn Step 3 into a packing problem instead of a generalized assignment problem if the minimum and maximum weekly hours of each agent are close or the same. In some cases, accounting for tours earlier in the scheduling process may mitigate this risk.

Figure 8:
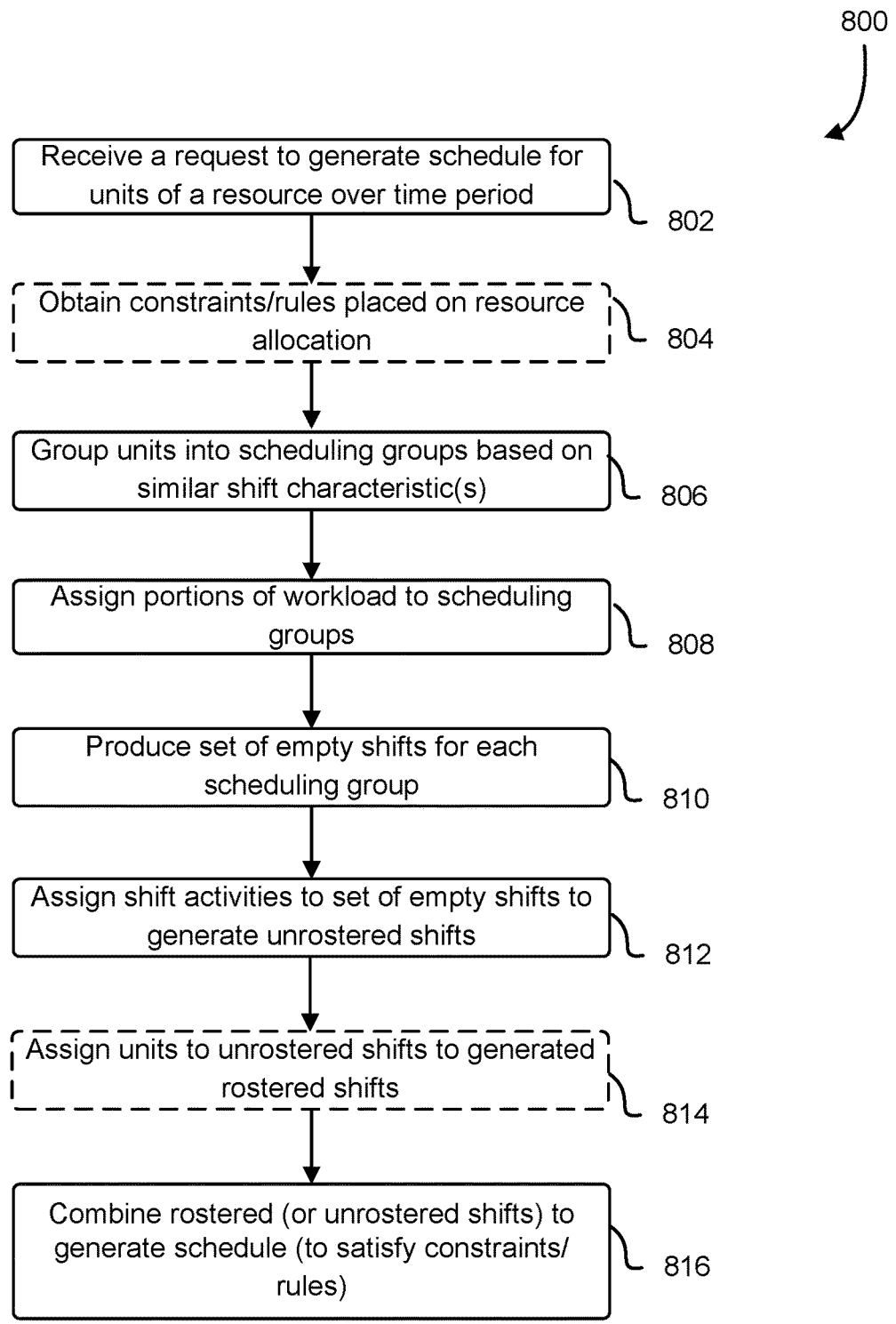
FIG. 8 illustrates an example process for decomposing a scheduling problem into scheduling groups, according to at least one embodiment.

FIG. 8 illustrates an example process 800 for decomposing a scheduling problem into scheduling groups, which utilized and incorporates the techniques described above. In some cases, process 800 may be performed at least in part by a contact service 110, scheduling service 116, and/or components thereof, such as the group decomposition process 120, and/or schedule generator 130, as described above in reference to FIG. 1. As used herein and described above, step 1 may correspond to operation 808, Step 2 may correspond to operation 810 and 812, and Step 3 may correspond to operation 814.

Process 800 may begin at operations 802, in which a request to generate a schedule for units of a resource over a time period may be received, for example, by a scheduling service. In some cases, the resource allocation may include allocation of various resources, such as computing resources, including processing capacity, memory capacity, virtual machine portions or complete virtual machines, or software containers. In other cases, as described above, the resources maybe human or agent resources, such as may include a pool of agents ready to be assigned shifts (hours of work) to process a workload (e.g., respond to contact center communications). Next at operation 804, constraints and/or rules relating to the resource allocation may be optionally obtained. The constraints or rules may include various constraints put on operation of the resource, such as duration of activity for computing resources or hours for human resources or agents (e.g., one or more restrictions on a number of hours agents of the plurality of agents are scheduled to work during at least a portion of the time period). In some cases, the constraints or rules may include any of agent rules 210, 310 staffing group rules 214, and/or shift profile rules 216, 322 described above in reference to FIGS. 2 and 3. In some cases, one or more constraints to be placed on scheduling shifts may be determined based on other constraints of units similar to the plurality of units of the resource.

At operation 806, units/agents may be assigned or grouped into scheduling groups based on one or more same or similar shift characteristics. The shift characteristics may include at least one of hours of operation, a duration, a type, or an activity profile, or various other attributes (e.g., as described above in reference to FIG. 3) of a shift that would make shifts within a scheduling group interchangeable for scheduling purposes. Operations 806 may include grouping a first set of units or agents that have similar shift characteristic(s) into a first group and a second set of units or agents with different similar shift characteristics(s) into a second group, and so on. Next, at operation 808, portions of the workload (e.g., communications to process for a contact service center) may be assigned to the different scheduling groups. At operations 810, a set of empty shifts may be produced for each scheduling group to process the corresponding portion of the workload.

At operation 812, shift activities may be assigned to the set of empty shifts for each of scheduling group to generate unrostered shifts. In some cases, the unrostered shifts may be combined to generate a primary schedule, at operation 816, such that the primary schedule satisfies any constraints placed on the schedule, units/agents, or shifts thereof. In other cases, optionally, units of the resource/agents may be assigned to the unrostered shifts to generate rostered shifts for each scheduling group, at operation 814. In this case, the rostered shifts may be combined to generate a primary schedule, at operation 816, such that the primary schedule satisfies any constraints placed on the schedule, units/agents, or shifts thereof.

Figure 9:
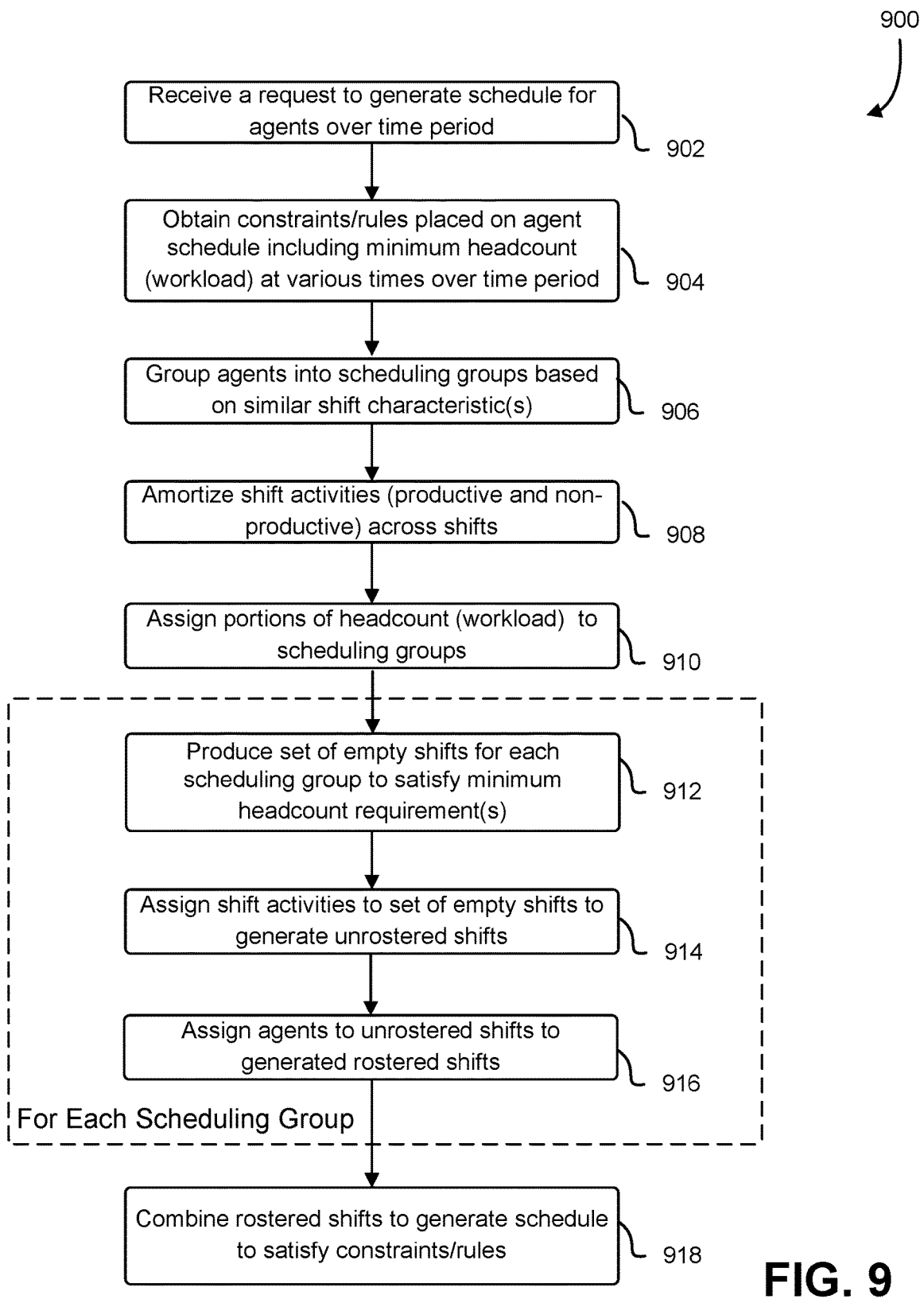
FIG. 9 illustrates another example process for decomposing a scheduling problem into scheduling groups, according to at least one embodiment.

FIG. 9 illustrates another example process 900 for decomposing a scheduling problem into scheduling groups. In some cases, process 900 may be performed at least in part by a contact service 110, scheduling service 116, and/or components thereof, such as the group decomposition process 120, and/or schedule generator 130, as described above in reference to FIG. 1. Many of the operations of process 900 may share aspects of similar operations of process 800 described above in reference to FIG. 8, and for the sake of brevity, will not described in detail again here. As used herein and described above, step 1 may correspond to operation 910, Step 2 may correspond to operation 912 and 914, and Step 3 may correspond to operation 916.

Process 900 may begin at operations 902, in which a request to generate a schedule for agents, such as associated with a contact center service, over a time period may be received, for example, by a scheduling service. In some cases, agents may be scheduled from a pool of agents ready to be assigned shifts (hours of work) to process a workload (e.g., respond to contact center communications). Next at operation 904, constraints and/or rules relating to the agent scheduling may be obtained. In some examples, the constraints may include a minimum headcount such as at intervals during the time period (e.g., a fraction of a time window, such as anywhere from 1 or 5 minutes, to 15 minutes, to an 1, 2, 3, 8, 12, 24 hours, and so on), for which the agent scheduling must meet to process a workload of communication volume for a contact service center. The constraints or rules may also include various constraints placed on the agents, such as duration of activities for the agents, one or more restrictions on a number of hours agents of the plurality of agents are scheduled to work during at least a portion of the time period, etc. In some cases, the constraints or rules may include any of agent rules 210, 310 staffing group rules 214, and/or shift profile rules 216, 322 described above in reference to FIGS. 2 and 3. In some cases, one or more constraints to be placed on scheduling shifts may be determined based on other constraints of units similar to the plurality of units of the resource.

At operation 906, agents may be assigned or grouped into scheduling groups based on one or more same or similar shift characteristics. The shift characteristics may include at least one of hours of operation, a duration, a type, or an activity profile, or various other attributes (e.g., as described above in reference to FIG. 3) of a shift that would make shifts within a scheduling group interchangeable for scheduling purposes. Operation 906 may include grouping a first set of agents that have similar shift characteristic(s) into a first group and a second set of agents with different similar shift characteristics(s) into a second group, and so on. In some aspects, operation 906 may include selected agents for different scheduling groups via an unsupervised process, such as using one or more machine learning models. In these cases, groupings and characteristics of the agents/shifts used to determine grouping may be inferred or implicit from prior groups, and adapted based on additional inputs to the scheduling service.

Next, at operation 908, shift activities (e.g., product and non-productive) may be amortized or approximated in time across shifts for the agents in the different scheduling groups to enable approximate allocation and assignment across the different scheduling groups to meet the minimum headcount requirement. Accordingly, at operation 910, portions of the headcount (e.g., the workload) may be assigned to individual schedule groups. At operations 912, a set of empty shifts may be produced for each scheduling group to meet the headcount requirement to manage contact volume, for example. In some cases, operations 908, 910, and/or 912 may be performed as part of operation 906. In some cases, one or more of operations 906-912 may be performed using at least one mixed integer linear program.

At operation 914, shift activities may be assigned to the set of empty shifts for each of scheduling group to generate unrostered shifts. In some cases, assigning shift activates to the set of empty shifts for each scheduling group may be performed concurrently or in parallel for some or all of the scheduling groups. In some aspects, any or all of operations 912-916 may be performed in parallel or concurrently for different scheduling groups, to decrease the ultimate time taken to generate a primary schedule for the different scheduling groups.

Agents may then be assigned to the unrostered shifts to generate rostered shifts for each scheduling group, at operation 916. In some cases, assigning agents of the plurality of agents to the unrostered shifts to generate the rostered schedule of shifts for each scheduling group may be performed concurrently or in parallel for some or all of the different scheduling groups.

The rostered shifts may be combined to generate a primary schedule, at operation 918, such that the primary schedule satisfies any constraints placed on the schedule, agents, or shifts thereof. In some cases, process 900 may also include modifying at least one of: an assignment of a portion of the workload to the first or second scheduling group or a shift placement within the rostered schedule, to satisfy at least one constraint.

Figure 10:
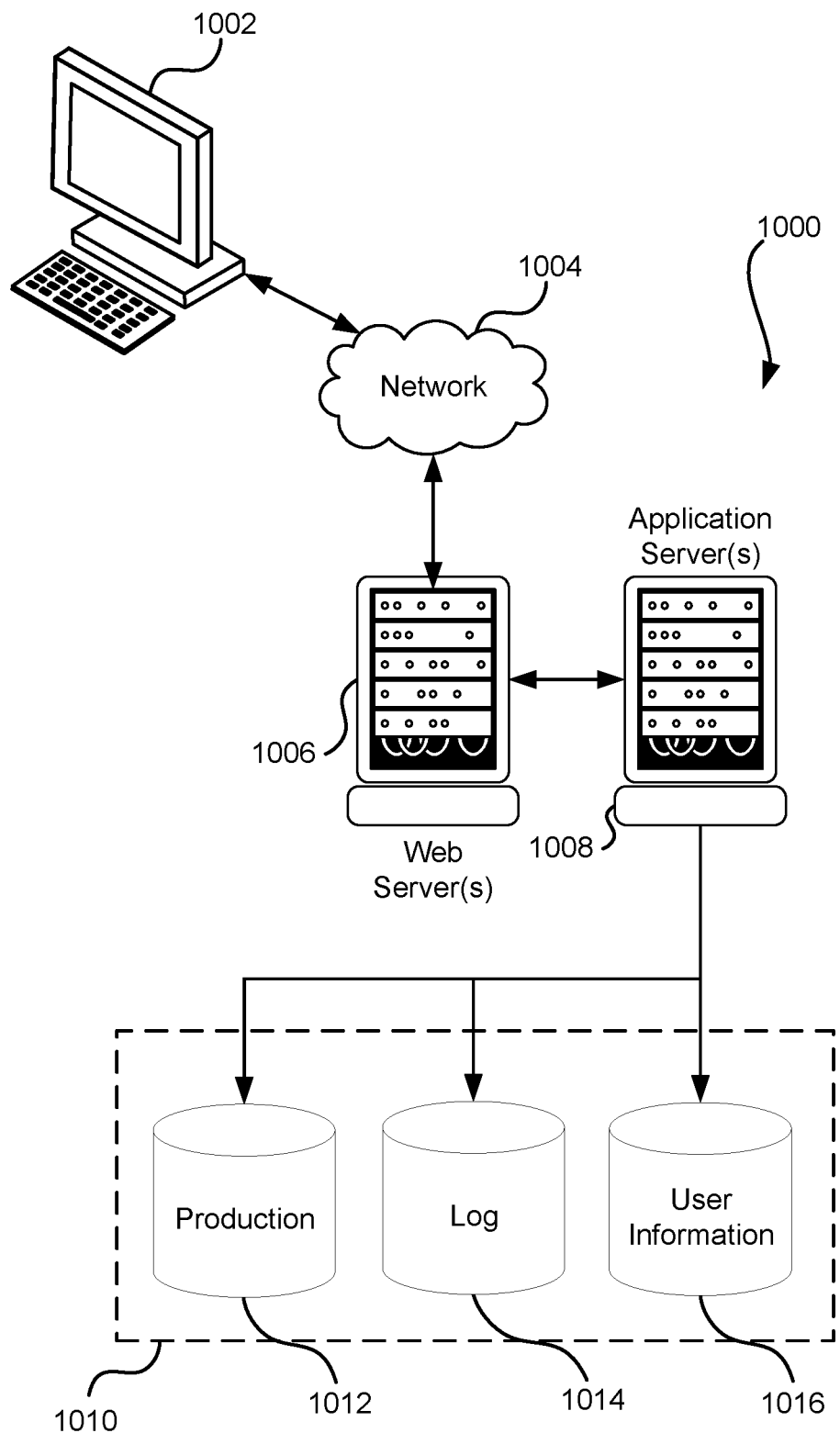
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto, and the application server 1008 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle °, Microsoft °, Sybase °, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   receiving a request to generate a schedule for processing a workload, the schedule spanning a first time period for a plurality of agents of a contact center service and comprising a number of shifts associated with individual agents of the plurality of agents;
grouping agents of the plurality of agents associated with a same shift profile into a scheduling group of a plurality of scheduling groups such that the agents within the scheduling group are interchangeable, wherein at least two agents of the plurality of agents are assigned to different scheduling groups of the plurality of scheduling groups;
dividing and assigning the workload among the plurality of scheduling groups, wherein individual scheduling groups of the plurality of scheduling groups are assigned a portion of the workload;
for individual scheduling groups of the plurality of scheduling groups:
generating a set of empty shifts to process the corresponding portion of the workload;
assigning shift activities to the set of empty shifts to create a set of unrostered shifts; and
assigning agents of the plurality of agents to the set of unrostered shifts to generate a set of rostered shifts; and
combining the sets of rostered shifts to generate a rostered schedule.

2. The computer-implemented method of claim 1, wherein shift activities comprise at least one of a productive activity and a non-productive activity, and wherein dividing and assigning the workload among the plurality of scheduling groups further comprises amortizing productive activities and non-productive actives in time across the set of empty shifts.

3. The computer-implemented method of claim 1, wherein assigning of agents to the set of unrostered shifts is subject to at least one constraint, wherein combining the sets of rostered shifts to generate the rostered schedule further comprises modifying at least one of: an assignment of a portion of the workload to at least one scheduling group of the plurality of scheduling groups, or a shift placement within the rostered schedule, to satisfy the at least one constraint.

4. The computer-implemented method of claim 1, wherein assigning agents of the plurality of agents to the set of unrostered shifts to generate the set of rostered shifts is performed in parallel for at least two scheduling groups of the plurality of scheduling groups.

5. A system, comprising:
one or more processors; and
memory that stores computer-executable instructions that, if executed, cause the one or more processors to:
receive a request to generate a schedule for processing a workload, the schedule spanning a first time period for a plurality of agents of a contact center service and comprising a number of shifts associated with individual agents of the plurality of agents;
grouping agents associated with at least one same shift characteristic into a first scheduling group such that the agents in the first scheduling group are interchangeable;
assigning a first portion of the workload to the first scheduling group and a second portion of the workload to a second scheduling group;
producing a set of empty shifts for each of the first and second scheduling groups to process the corresponding portion of the workload; and
assigning shift activities to the set of empty shifts for each of the first and second scheduling group to generate unrostered shifts, the unrostered shifts comprising the schedule.

6. The system of claim 5, wherein the at least one same shift characteristic comprises at least one of: hours of operation, a duration, a type, or an activity profile.

7. The system of claim 5, wherein the shift activities comprise at least one of a productive activity and a non-productive activity, and wherein assigning the first portion of the workload to the first scheduling group and the second portion of the workload to the second scheduling group further comprises approximating productive activities and non-productive actives in time across the corresponding set of empty shifts.

8. The system of claim 5, wherein assigning shift activates to the set of empty shifts for each of the first and second scheduling group is performed concurrently for the first scheduling group and the second scheduling group.

9. The system of claim 5, wherein the memory stores additional computer executable instructions that, if executed, further cause the one or more processors to:
assign agents of the plurality of agents to the unrostered shifts to generate a rostered schedule of shifts.

10. The system of claim 9, wherein assigning agents of the plurality of agents to the unrostered shifts to generate the rostered schedule of shifts for each of the first and second scheduling group is performed concurrently for the first scheduling group and the second scheduling group.

11. The system of claim 9, wherein assigning of agents to the set of unrostered shifts is subject to at least one constraint, and wherein the memory stores additional computer executable instructions that, if executed, further cause the one or more processors to:
modifying at least one of: an assignment of a portion of the workload to the first or second scheduling group or a shift placement within the rostered schedule, to satisfy the at least one constraint.

12. The system of claim 5, wherein assigning the first portion of the workload to the first scheduling group and the second portion of the workload to the second scheduling group is performed using at least one mixed integer linear program.

13. A non-transitory computer-readable storage medium storing thereon executable instructions that, as a result of being executed by one or more processors of a computer system, cause the computer system to at least:
receive a request to generate a schedule for processing a workload, the schedule spanning a first time period for a plurality of units of a computing resource and comprising a number of shifts associated with individual units of the plurality of units;
group first units associated with at least one first same shift characteristic into a first scheduling group and group second units associated with at least one second same shift characteristic into a second scheduling group;
assign a first portion of the workload to the first scheduling group and a second portion of the workload to the second scheduling group;
produce a set of empty shifts for each of the first and second scheduling groups to process the corresponding portion of the workload;
assign shift activities to the set of empty shifts for each of the first and second scheduling group to generate unrostered shifts; and assign units of the plurality of units to the unrostered shifts to generate a rostered schedule of shifts, the rostered shifts comprising the schedule.

14. The non-transitory computer-readable storage medium of claim 13, wherein at least one of the at least one first same shift characteristic or the at least one second same shift characteristic comprises at least one of: hours of operation, a duration, a type, or an activity profile.

15. The non-transitory computer-readable storage medium of claim 13, wherein the shift activities comprise at least one of a productive activity and a non-productive activity, and wherein assigning the first portion of the workload to the first scheduling group and the second portion of the workload to the second scheduling group further comprises amortizing productive activities and non-productive actives in time across the corresponding set of empty shifts.

16. The non-transitory computer-readable storage medium of claim 13, wherein assigning shift activates to the set of empty shifts for each of the first and second scheduling group is performed in parallel for the first scheduling group and the second scheduling group.

17. The non-transitory computer-readable storage medium of claim 13, wherein the first units associated with the first scheduling group are interchangeable, and the second units associated with the second scheduling group are interchangeable.

18. The non-transitory computer-readable storage medium of claim 13, wherein assigning the first portion of the workload to the first scheduling group and the second portion of the workload to the second scheduling group is performed using at least one mixed integer linear program.

19. The non-transitory computer-readable storage medium of claim 13, wherein individual units of plurality of units of the computing resource comprise at least one of processing capacity, memory capacity, a virtual machine, or a software container.

20. The non-transitory computer-readable storage medium of claim 13, wherein the first scheduling group comprises agents selected via an unsupervised process and the second scheduling group comprises agents selected via the unsupervised process.

* * * * *